United States Patent [19]

Metz

[11] Patent Number: 5,500,131
[45] Date of Patent: Mar. 19, 1996

[54] COMPOSITIONS AND METHODS FOR WATER TREATMENT

[76] Inventor: Jean-Paul Metz, 90-2 Sukhumvit Soi 31, 10012 Bangkok, Thailand

[21] Appl. No.: 223,271

[22] Filed: Apr. 5, 1994

[51] Int. Cl.$^6$ ........................................................ C02F 1/52
[52] U.S. Cl. ........................ 210/705; 210/724; 210/726; 210/912; 210/747
[58] Field of Search ................................. 210/602, 702, 210/705, 716, 724, 723, 730, 726, 727, 902, 912, 747; 47/1.4

[56] References Cited

U.S. PATENT DOCUMENTS

| | | | |
|---|---|---|---|
| T980,003 | 3/1979 | Brackman | 260/42.37 |
| 3,097,163 | 7/1963 | Riddick | 210/726 |
| 3,431,200 | 3/1969 | Davis et al. | 210/726 |
| 3,462,360 | 8/1969 | McKinney | 210/730 |
| 4,279,756 | 7/1981 | Weiss et al. | 210/711 |
| 5,240,600 | 8/1993 | Wang et al. | 210/188 |
| 5,346,643 | 9/1994 | Kuno | 210/716 |

FOREIGN PATENT DOCUMENTS 52-13671  4/1977  Japan ................................. 210/726

*Primary Examiner*—Peter A. Hruskoci
*Attorney, Agent, or Firm*—Saliwanchik & Saliwanchik

[57] ABSTRACT

Materials and methods relating to water treatment processes are described. More specifically, the process is non-toxic and is useful for the removal of algae, other suspended solids, or contaminants in surface waters or in potable water treatment. Coccolithic calcium carbonate can be used in combination with a flocculent such as aluminum chloride to obtain the desired results.

11 Claims, No Drawings

COMPOSITIONS AND METHODS FOR WATER TREATMENT

BACKGROUND OF THE INVENTION

The degradation of the water quality in our lakes, rivers, and streams has many causes, including agricultural or sewage pollution, over-fertilization of surrounding land areas, fallen foliage, coniferous plantations, and acid rain. In some situations, a eutrophic environment is established and results in formation of sediments, excessive algae and aquatic plant growth, high organic matter content, formation of foul odor-causing substances, and water turbidity. These have harmful effects on fish and other aquatic animals and plants. Turbidity resulting from suspended solids in the water filters sunlight which decreases photosynthesis and thereby reduces the amount of dissolved oxygen available in the water.

Previous attempts to clarify and purify eutrophic waters have often enlisted the use of toxic substances to kill the microorganisms which flourish therein. Other disadvantages, in addition to toxicity, result from this approach. In most cases, the biocidal effect of these toxic substances is incomplete, which allows a rapid recovery by the microorganisms. Thus, the results are only temporary and are generally ineffective.

Examples of such uses of toxic substances include the use of heavy metals and their salts, such as copper sulfate. Copper sulfate is virtually the only chemical agent used to control the planktonic algae that cause the majority of aesthetic and water quality problems. Although the province of Alberta, Canada has prohibited the use of copper on all surface waters, in the United States it is currently permitted in water used for swimming, fishing, irrigation, and consumption by both livestock and humans.

Primary U.S. producers estimate the current annual consumption of copper sulfate for water treatment at 5700 metric tons. Most of the copper used is in the form of a pentahydrate ($CuSO_4 \cdot 5H_2O$), which is approximately 25% copper by weight. Formulators buy the material from the primary producers and distribute the pentahydrate in crystals, granules, and powders (snow) under the trade names Blue Copper™, Bluestone™, and Blue Vitrol™.

Scientific studies show copper is toxic, and prolonged use breeds copper resistant strains of algae. Recent public concern over environmental and economic issues are expected to ultimately result in a reduction in the use of copper as an algicide. Municipalities are among the largest users of copper. A single municipality in Minnesota terminated a reservoir treatment program due to environmental pressure, and in so doing reduced the entire state's use of copper surfate for algae control from 145 tons in 1989 to 66 tons in 1990.

Copper salts, especially the widely used copper sulfate, are contact herbicides and do kill most forms of algae. They fail, however, to eliminate the cause of excessive algal growth, i.e., the high nutrient levels associated with eutrophic water conditions. The use of copper salts can cause the algal cells to sink to the lake bottom where they are quickly decomposed by bacteria, thereby releasing nutrients, especially orthophosphates, into the water. These released nutrients can then potentiate a new algal bloom. Thus, the problem of algal blooms is only temporarily and incompletely addressed by the use of copper salts.

Introduction of the toxic substances into surface waters can also kill the desirable aquatic plant and animal life. Even if the quantities of toxic substances are rigidly monitored and controlled, repeated treatments are necessary due to the temporary efficacy, resulting in accumulation of the toxic substances within the system and bioaccumulation in fish and other aquatic organisms. Also, studies have shown that blooms of copper-resistant algae occur following copper treatment.

Attempts have been made to circumvent the use of highly toxic substances. Potable water treatment plants commonly treat water by using poly-aluminum chloride (PAC) as a flocculent to precipitate algae. Problems can occur when the algal concentrations are relatively low because the algae simply do not flocculate and go right through the filters. Also, living algal cells do not flocculate or tend to escape from the floc. Therefore, the algae must first be killed with an ozone treatment and must be in relatively high concentration before flocculation can occur with the use of PAC.

In addition, the flocs formed by treatment with PAC are described as very "fluffy," i.e., having low density, and having extremely high water content. These flocs are very difficult to filter and to dewater.

A number of basic reactants, including calcium hydroxide, calcium oxide, magnesium hydroxide and oxide have been employed with flocculents and are sometimes termed co-flocculents. These basic substances, however, can increase the pH of the treated waters to the level of endangering the aquatic plants and animals. For example, if these basic substances are used in amounts which increase the pH into the dangerous zone above pH 9, undissociated bases, e.g., ammonia, can provoke mass mortalities in fish and other organisms. In addition, these basic reactants are caustic and can present a health hazard for the personnel using them. Application rates for these compounds therefore have to be very precise in order to avoid harmful side-effects. In certain areas, their use is restricted due to their non-natural origin, their health hazards, and their potentially damaging effects on the aquatic environment.

Natural substances such as coccolithic calcium carbonate have been successfully employed for water-related applications in Europe. When sprayed over a pond surface, for example, the product will eventually settle on the organic mud sediments and accelerate their mineralization. However, coccolithic calcium carbonate, when used alone, has proven unsuccessful in subtropical or tropical climates such as Florida, where sunlight and other conditions are more conducive to rapid algal growth.

Therefore, more effective non-toxic compositions and techniques for purification and clarification of water are clearly needed.

BRIEF SUMMARY OF THE INVENTION

The subject invention pertains to novel compositions and methods for effectively treating water containing excessive nutrients, pollutants, micro-algae, other microorganisms, or other suspended particles. The treatment comprises the use of a calcium carbonate, preferably coccolithic calcium carbonate, in combination with a flocculent, e.g., aluminum salts, iron salts, and the like.

In accordance with the subject invention, introduction into water of coccolithic calcium carbonate in combination with a flocculent produces flocs which precipitate rapidly and result in clarification of the water. The coccolithic calcium carbonate can be introduced before, simultaneously with, or after the addition of a flocculent.

Another element of the described treatment is the removal of heavy metals or other harmful substances from the water. A desirable application of this advantageous property is the enhancement of water purification procedures including, for example, providing potable water for human or animal consumption. It would be readily apparent to persons of ordinary skill in the art that these advantageous properties could be adapted to and used in other water purification applications as well. The use of the coccolithic calcium carbonate in combination with a flocculent removes potentially harmful phosphates or other phosphorus compounds as well as the algae or other suspended solids which can remain following currently used purification techniques. Subsequent sterilization by boiling, chlorination, ozonation, or UV-treatment is thereby enhanced by the prior removal of the suspended solids and algae. In addition, combining coccolithic calcium carbonate with magnesium-containing compounds, e.g., magnesite or dolomite, has been shown to precipitate ammonium salts as insoluble magnesium ammonium phosphate.

The floc produced according to the subject invention is, itself, a novel composition comprising calcium, algae, and a flocculent. The novel floc produced by this process under usual conditions has a density greater than the water and thus settles as a covering of the floor or bed of the body of water being treated. The floc sediment can be useful as a nutrient source for aquatic plants growing in a lake or river bed. Advantageously, the sediment can form a barrier on a lake or river bottom, which provides an effective seal between the sediment on a lake or river bottom and the surface water, thereby preventing toxic or harmful contaminants and nutrients from leaching into the water from a previously contaminated or nutrient-rich lake or river bottom.

A further advantage of the described process takes place even in water having relatively few suspended solids, algal cells, or other flocculable materials. When an aluminum salt is added in the presence of coccolithic calcium carbonate, a strong floc forms instantly. This means that the process can be used even in clean waters to eliminate phosphates and other unwanted molecules present in very small concentrations. In such a situation, adding a flocculent such as an aluminum salt, alone, produces only a clear dilute aluminum salt solution and no floc formation.

Another advantage of this invention is that the floc settles, dewaters, and filters very well. This makes the process applicable to situations such as in swimming pools, thereby reducing or eliminating the need for chlorination. The invention can also be used to treat sewage, or other wastewater, e.g., agricultural or industrial wastewater. The process is applicable to potable water treatment, reducing the cost of sludge treatment. As for lake and pond treatment, an installation can be employed whereby the lake water is treated in a reactor and filtered before returning it to the lake. The filter may be, for example, a sand filter.

Alternatively, the floc can be separated from the water and used as a fertilizer for agricultural purposes. The nutritional value of the floc can also be utilized for food in aquaculture, formulated appropriately as food for fish or shellfish and the like.

Under certain conditions, the floc can be formed in the presence of a high concentration of gas which is incompletely solubilized in the water, for example, a supersaturated solution. Gas bubbles can be incorporated into the floc and thereby render the floc less dense than the water. The floc therefore tends to float to the surface of the water where it can be easily removed.

The algae, formed as a component of the floc, also advantageously retain their metabolic, e.g., photosynthetic, activity. Thus, the floc can be used in a bioreactor to carry out appropriate reactions for the production of bioproducts. Coccolithic calcium carbonate is insoluble in water and therefore its reaction with the flocculent can be described as a physical process by which the coccolithic calcium carbonate particles are enmeshed by attachment to the positive ions of the flocculent and subsequent polymers.

DETAILED DISCLOSURE OF THE INVENTION

The subject invention includes a novel method for the treatment of water contaminated with certain chemicals, micro-algae, other microorganisms, or other suspended particles. More specifically, water containing these contaminants can be effectively treated by application of coccolithic calcium carbonate preceded by, used simultaneously with, or followed by application of flocculents such as aluminum salts or iron salts. It is apparent from this disclosure that the subject invention can have a variety of applications. These include treatment of sewage to remove contaminants and suspended solids. The subject method can also be used to clarify or otherwise purify a lake or other body of water and also can be used in a process to provide potable water. Other obvious variations are also intended to be part of this invention.

By using the combined coccolithic calcium carbonate-flocculent treatment, under normal conditions, water contaminants are enmeshed or entrapped within the newly-created floc structure and drawn to the lake/pond bottom by gravity. In the case of algae, the algae remain alive and continue to photosynthesize within the floc, so long as nutrients and light are available. Upon their eventual death, the algal cells may be decomposed by bacteria, but the nutrients remain trapped within the floc structure. The phosphates remain in chemically insoluble forms due to the high pH conditions assured by the fact that the coccolithic calcium carbonate is used in excess and that coccolithic calcium carbonate particles are therefore present in the floc.

Coccolithic calcium carbonate is composed of coccolithic shells and shell fragments and is commercially available. One gram can contain the equivalent of 88 billion shells. At dosages between 100 and 1,000 mg/L, this corresponds to between 8 and 88 million shells per ml of water treated. In one embodiment of the subject invention, a quantity of 50 to 2,000 mg/L of coccolithic calcium carbonate is added as a slurry suspended in water. In the presence of a flocculent, this results in formation of a very strong floc with exceptionally good sedimentation characteristics. Sedimentation begins within 30 seconds from formation of the floc and can completely settle out within 300 seconds. Results are similar in brackish or salt water as well as fresh water.

The specific weight of the coccolithic calcium carbonate particles is much higher than that of living algal cells. Therefore, the floc itself has a higher specific weight and a higher settling speed than the flocs formed with algae alone. Since the coccolithic calcium carbonate particles do not retain water, the floc has much better consolidation and dewatering characteristics than a floc obtained with algae and aluminum alone.

Coccolithic calcium carbonate, although insoluble in water, offers a large surface area that reacts with the added flocculent, similar to reaction with a soluble base. The resulting floc, however, is advantageously of a higher relative density and improved settling and dewatering characteristics, as compared to flocs obtained with the flocculents used alone. Contrary to soluble co-flocculents such as sodium carbonate or calcium hydroxide, coccolithic calcium carbonate has no potentially harmful effects on aquatic organisms. If these soluble basic compounds are used in less than the required amounts, the pH is too low to ensure the total precipitation of the flocculents, and toxic levels of these flocculents remain in solution. In large bodies of water, this precise balance between flocculents and soluble bases is almost impossible to achieve. Due to its lack of solubility in water, coccolithic calcium carbonate can be, and is preferably, provided in excess, relative to the particular flocculent used, in order to guarantee the total elimination of the soluble toxic flocculent salts from the water body. With coccolithic calcium carbonate in excess, only the quantity needed reacts, and the rest of the unaltered particles remain enmeshed in the floc. The potentially harmful metal salts or other contaminants are totally eliminated from the supernatant water by using the coccolithic calcium carbonate in excess relative to flocculent.

Any known flocculent can be used in combination with the coccolithic calcium carbonate, especially those flocculents hydrolyzing in conditions between pH 5 and pH 10. Typically, these flocculents may be metal salts. The best results are obtained with an aluminum salt, e.g., poly-aluminum chloride (PAC). Other flocculents can include iron salts, especially ferric chloride and ferric sulfate, and other aluminum salts such as aluminum chloride, aluminum sulfate, aluminum potassium sulfate, and aluminum nitrate. Combinations of these flocculents can also be used.

For example, one liter of water containing suspended unicellular algae (mostly Chlorophycaeae) can be treated with a quantity of 5 to 100 mg/L of aluminum under the forms of either aluminum sulfate, aluminum potassium sulfate, PAC, or aluminum chloride dissolved in water.

Both the settling speed and the consolidation/dewatering characteristics of flocs/sludges are very important factors in water treatment. A higher settling speed means shorter retention times in the settling tanks used in water treatment processes. Therefore smaller settling tanks can be used. A rapid consolidation (floc formation) and good dewatering behavior, advantageously exhibited by the use of coccolithic calcium carbonate in combination with a flocculent, means that smaller volumes of sludge have to be stored, transported, disposed of, or thermically dried.

When the coccolithic calcium carbonate and an aluminum salt are used in proper proportions relative to each other as described herein, the water clarity obtained is very high, with no turbidity or opalescence observed. Coccolithic calcium carbonate is a natural, non-toxic substance which can be used in excess quantities relative to the aluminum salt, resulting in a certain amount of non-flocculated coccolithic calcium carbonate. The non-flocculated coccolithic calcium carbonate stays in suspension longer than when flocculated, giving the water a whitish-colored turbidity, which subsequently settles on the primary floc sediment.

One advantage of this combined treatment method over treatment with aluminum salts or other flocculents alone is that the pH is stabilized in a very favorable range between about pH 7 and pH 8.5. The chemical nature of the coccolithic calcium carbonate buffers any present organic or mineral acids. Stabilization of the pH occurs in a range of 7.0 to 8.5 in the water-sediment transition layer, which is a very favorable pH range for the activity of many aquatic microorganisms. This pH buffer effect also counteracts the internal recycling of phosphates which become soluble at low pH values and are therefore released from the sediments into the main water body when the pH drops below 6. Also, the toxicity or other potentially harmful effects of these metal ions are eliminated because substantially all of the aluminum ions introduced into the aquatic system are precipitated or flocculated by the excess quantities of coccolithic calcium carbonate and are therefore transformed into insoluble forms. Coccolithic calcium carbonate in the presence of copper salts and/or other substances currently in use for water treatment produces the same effect. Accordingly, the coccolithic calcium carbonate can be used for detoxifying aquatic environments after use of metal salts or other potentially harmful substances which are bound and precipitate in the formed floc.

The subject invention can also be used as an algae- and nutrient-removal technique whereby lake water is continuously or discontinuously mixed with the coccolithic calcium carbonate and flocculent and the resulting floc retained in sedimentation tanks or on adequate filtering devices.

The combined water treatment method described herein can be used as an in-lake treatment, whereby the algae, nutrients, and suspended solids are flocculated and settle on the bottom of the lake as a heavy sediment, separating the original sediment layer from the water column and blocking the diffusion or convection of nutrients, e.g., phosphorus-containing compounds, from the original sediment into the water column.

Another advantageous use of this technique is for removal of algae, nutrients and suspended solids from waters used for human or animal consumption, especially in cases where such algae have toxic properties. Subsequent sterilization of drinking water by boiling, chlorination, ozonation, or UV-treatment can be made more effective by prior removal of algae and suspended solids.

Employing magnesium-containing compounds such as magnesite or dolomite or soluble magnesium salts, in combination with the coccolithic calcium carbonate, produces an additional desirable effect by precipitating ammonium salts as insoluble magnesium-ammonium phosphate, thereby eliminating harmful ammonium from the water.

Advantageously, even after resuspension by strong agitation, the flocs settle readily again, diminishing in volume over time. A floc volume of between 1 and 3 percent of the treated water volume is commonly obtained. This has the advantage of producing only a thin layer of sediment which means that several treatments can be done before any removal of sedimentation is needed.

Alternatively, under certain conditions of high relative concentration of gas in the water to be treated, the floc can be formed with less specific density than the water whereby the floc can float near the surface of the water. Relative concentration of gas refers to concentration of dissolved gas in solution relative to the gas-dissolving capacity of the solvent, in this case, water. It is known that certain environmental conditions can affect the solubility of a gas in a liquid. For example, decreasing temperature of the liquid increases solubility of a gas therein. Thus, the concentration of gases, e.g., oxygen or carbon dioxide, in cold water is usually higher than in warm water. Other factors can contribute to the total amount of gas available in the water. For example, photosynthetic algae produce oxygen when exposed to sunlight. The high level of oxygen in the water is then available for oxygen-utilizing organisms, including non-photosynthetic and photosynthetic algae (by photorespiration), bacteria, and other respiring organisms, e.g., fish. Under optimum conditions of light, temperature, and other known factors that can affect the concentration of gas in the water, these algae can produce saturating or even supersaturating levels of oxygen in the water. It would also be apparent that high concentrations of carbon dioxide can be produced by organisms which undergo respiration. High concentration of gases can also be artificially produced by well-known procedures, e.g., mechanically introducing gas into the water. During floc formation under these conditions, the gases are either not completely dissolved, i.e., forming "microbubbles," or are readily taken out of solution to form these microbubbles. These microbubbles, which are typically less than 100 microns in diameter, can then be incorporated into the floc and thereby make the floc less dense than the water. The less dense flocs tend to float to the surface of the water where they can easily be removed by skimming or other common filtration procedure. This can be an advantage where it is desired to remove the floc from the surface of the water. This method also can facilitate the collection of floc when the floc is needed for additional use.

The floc produced by the described technique is a novel composition which has excellent settling characteristics. The floc obtained by the described process is of greater density and lighter in color than the flocs obtained with aluminum salts or other flocculents used alone, i.e., without the added coccolithic calcium carbonate. The novel floc has a relatively high density which results in superior settling characteristics. In addition, the novel floc has excellent dewatering characteristics, which facilitate recovery of the floc for subsequent uses.

The floc, or coccolithic calcium carbonate associated therewith, remains active for long time periods. Therefore, the floc which has settled to the bottom of a body of water can be remixed in the water by agitation or stirring to adsorb additional algae or particles or nutrients. Alternatively, the floc can be readily separated from the purified water by sedimentation and/or centrifugation and/or filtration. In lakes or other large bodies of water, if the sediment has built up over years of multiple treatments, the floc can be dredged or siphoned or pumped or otherwise removed from the bottom of a lake. If the floc is to be extracted for other, or additional, use, a preferred method of treatment can be to treat the water in a separate container or sedimentation tank which can be made suitable for easy separation of the sediment. The floc can then readily be dried by spray-drying, evaporation, lyophilization, or any known drying technique.

The dried floc is a granular or powder-like substance having a pale green color. The floc has uses applicable to agriculture, aquaculture, and horticulture. Since this dry material contains the algal biomass and nutrients flocculated from the treated water in addition to calcium, it can be used as a fertilizer. The described method and floc can also be used in aquacultural applications. The dry material or the wet floc slurry can also be used as a food for fish, crustaceans, and other aquatic animals, or as a feed additive for other animals. Another commercial use would be as a biological activator for lakes, ponds, septic tanks, and the like.

Following are examples which illustrate procedures, including the best mode, for practicing the invention. These examples should not be construed as limiting. All percentages are by weight and all solvent mixture proportions are by volume unless otherwise noted.

EXAMPLE 1

Most of the experiments were carried out in volumes between 1 and 20 liters of algae-enriched water. Some experiments were carried out in lake enclosures of up to 50,000 liters. Water temperatures varied between 15° and 35° C.

Coccolithic calcium carbonate was added to the algae-enriched water samples, either as a dry powder or as a slurry containing between 50 and 800 grams of coccolithic calcium carbonate per liter of aqueous suspension. Mixing was done by mechanical or manual stirring and/or by air injection until a homogeneous suspension of coccolithic calcium carbonate was obtained. Any means for mixing the component into the water is sufficient. Upon addition of the "accelerator" (flocculent), e.g., aluminum salt, iron salt, or the like, sedimentation began within 30 seconds and was complete within about 300 seconds. Similar effects were obtained by first adding the flocculent and thereafter the coccolithic calcium carbonate. In order to stabilize pH when flocculent was added first, best results were obtained by adding the coccolithic calcium carbonate within 5 minutes after the accelerator treatment.

Since most flocculents such as aluminum or iron salts can acidify the water and can have strongly toxic effects on fish and other aquatic organisms, it is preferable in treatment of lakes or other surface waters to add the flocculent after the coccolithic calcium carbonate. Coccolithic calcium carbonate suspended throughout the water body reacts immediately with the flocculent, yielding a totally insoluble floc and thereby preempting any toxicity problems. Even at very high dosages of both coccolithic calcium carbonate and flocculent, no mortality of zooplankton was observed.

EXAMPLE 2

In large bodies of water where the evenness of the dispersion could not always be guaranteed due to wind, currents, and the sheer size of the water body, the treatment can be employed as a three-step process, first adding coccolithic calcium carbonate, then flocculent, and finally coccolithic calcium carbonate in order to detoxify and flocculate any remaining pockets of free soluble flocculent in the water body. One advantage of the three-step treatment is to ensure that an excess amount of coccolithic calcium carbonate would always be present and to add a fine layer of coccolithic calcium carbonate on top of the precipitated floc, thereby enhancing the nutrient fixation and providing an even more effective insulation between the old sediments, the precipitated floc, and the water body.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. A method for treating water contaminated with algae, suspended solids, or toxic heavy metal compounds, said method comprising the steps:

(a) adding to the water a soluble metal salt flocculent in a quantity of between 5–100 milligrams per liter of the water;

(b) adding to the water 50–2000 milligrams of coccolithic calcium carbonate per liter of water; and (c) forming a floc including said algae, suspended solids, or toxic heavy metal compounds in said water at a pH of at least about 7.0.

2. The method, according to claim 1, wherein said metal salt is selected from the group consisting of aluminum chloride, aluminum surfate, aluminum potassium sulfate, aluminum nitrate, aluminum hydroxy-polychloride, ferric chloride, and ferric sulfate.

3. The method, according to claim 2, wherein said metal salt is poly-aluminum chloride.

4. The method, according to claim 1, wherein said metal salt is an iron salt.

5. The method, according to claim 1, wherein said coccolithic calcium carbonate is added in excess relative to said flocculent.

6. The method, according to claim 1, wherein said coccolithic calcium carbonate is added before said flocculent.

7. The method, according to claim 6, further comprising the step (c) adding a second amount of coccolithic calcium carbonate.

8. The method, according to claim 1, wherein said method further comprises increasing relative concentration of a gas in the water.

9. The method, according to claim 8, wherein said relative concentration of gas is increased by an algal metabolic process.

10. A process for forming a floc in water, said process comprising
   (a) providing water having a culture of algae growing therein;
   (b) adding to the water 50–2000 milligrams coccolithic calcium carbonate per liter of water;
   (C) adding to the water a soluble metal salt flocculent in a quantity of between 5–100 milligrams per liter of water; and (d) forming a floc including said algae in said water at a pH of at least about 7.0.

11. The process, according to claim 10, wherein said formed floc is less dense than the water.

* * * * *

UNITED STATES PATENT AND TRADEMARK OFFICE
CERTIFICATE OF CORRECTION

PATENT NO. : 5,500,131
DATED : March 19, 1996
INVENTOR(S) : Jean-Paul Metz

It is certified that error appears in the above-indentified patent and that said Letters Patent is hereby corrected as shown below:

Column 1: line 52: "surfate" should read --sulfate--.

Column 9: line 1: "aluminum surfate" should read --aluminum sulfate--.

Column 10: line 10: "(C)" should read --(c)--.

Column 10: line 12: "water; and (d) forming" should read --water; and (d) forming--.

Signed and Sealed this

Eighteenth Day of June, 1996

BRUCE LEHMAN

*Attest:*

*Attesting Officer*     *Commissioner of Patents and Trademarks*